United States Patent [19]

Klein et al.

[11] 4,132,619

[45] Jan. 2, 1979

[54] ELECTROCATALYST

[75] Inventors: Yitzchak Klein; Jonathan R. Goldstein, both of Jerusalem, Israel

[73] Assignees: State of Israel, Ministry of Industry, Commerce and Tourism, National Physical Laboratory of Israel; The Scientific Research Foundation, both of Jerusalem, Israel

[21] Appl. No.: 822,369

[22] Filed: Aug. 2, 1977

[30] Foreign Application Priority Data

Aug. 6, 1976 [IL] Israel .......................................... 50217

[51] Int. Cl.$^2$ .................. B01J 23/74; H01M 4/58; C25B 11/06; H01M 8/00

[52] U.S. Cl. ................... 204/242; 204/290 R; 204/290 F; 204/291; 252/425.3; 252/432; 252/518; 252/519; 429/40; 429/218; 429/221; 429/223

[58] Field of Search .............. 204/290 F, 290 R, 291; 252/432, 518, 519, 425.3; 429/40, 218, 223

[56] References Cited

U.S. PATENT DOCUMENTS

| | | | |
|---|---|---|---|
| 2,691,660 | 10/1954 | Hartig | 252/432 X |
| 3,649,485 | 3/1972 | Chisholm | 204/290 F |
| 3,711,382 | 1/1973 | Anthony | 204/1 R |
| 3,781,350 | 12/1973 | Fujita | 252/432 X |
| 3,926,844 | 12/1975 | Benczur-Urmossy | 252/432 |
| 3,986,892 | 10/1976 | Ewe et al. | 429/218 |
| 4,061,549 | 12/1977 | Hazelrigg et al. | 204/290 F |

*Primary Examiner*—F.C. Edmundson
*Attorney, Agent, or Firm*—Fleit & Jacobson

[57] ABSTRACT

The invention relates to mixed oxides of the spinel type or of similar structure, containing a quantity of boron adapted to reduce the electrical resistance of the oxide by a factor of at least 1000 calculated on the corresponding compound without boron, some of the preferred compounds being selected from compounds of the formulae $Co_xFe_{3-x}O_n$ and $Co_xNi_{3-x}O_n$, wherein x is between 0.05 and 3, n is between 3 and 5, containing from 0.05 to 20 atom per cent boron calculated on the mixed oxides, wherein part of the Co,Ni. or Fe may be substituted by an equivalent quantity of magnesium or calcium, said compounds being optionally doped with lithium; electrocatalytically active electrodes made from such compounds and electrical cells containing such electrodes.

17 Claims, No Drawings

ELECTROCATALYST

SUMMARY OF THE INVENTION

The present invention relates to novel electrocatalysts and to various products produced from these and also to processes wherein such catalysts are used.

More particularly the invention relates to novel mixed oxide electrocatalysts wherein there is incorporated a quantity of from about 0.05 to about 20 atom percent of boron. The incorporation of boron drastically increases the electrical conductivity. According to a preferred embodiment the novel electrocatalysts are lithiated.

Preferred electrocatalysts according to the present invention are spinel type or similar mixed oxides $Co_x$-$Fe_{3-x}O_n$ and $Co_xNi_{3-x}O_n$ wherein x is between 0.05 and 3, n is between 3 and 5, and preferably 3 to 4 or close to 4. The novel electrocatalytically active compounds are prepared either as a powder, preferably of large surface area, or in the form of a catalytically active surface.

Various products can be produced from such novel electrocatalysts. Amongst these there may be mentioned electrodes for various electrochemical processes, auxiliary electrodes for use in secondary cells of certain types, in fuel cells, etc.

Other and further aspects of the invention will become clear from the following detailed description.

FIELD OF THE INVENTION

Electrocatalysts are used both to speed up electrode reactions and to enable them to occur close to their thermodynamically predicted potentials. In electrochemical power supplies such as fuel cells, the incorporation of electrocatalysts into the electrode structure enables the fuel cell to operate near its theoretically expected potential even when appreciable current is drawn from the cell. The electrocatalyst is said to reduce the overvoltage for the electrode reaction.

A related example is the water electrolysis cell; electrocatalysts are vital here to lower the minimum voltage necessary for electrolysis to occur, and to keep it low as the rate of electrolysis at the electrodes is increased — this will permit high efficiency of operation.

The most active electrocatalysts are noble metals such as platinum and palladium, but their high cost precludes widespread application. Whilst the noble metal may be used more effectively by supporting them on a low cost substrate, in certain situations (e.g., battery technology) even a trace of platinum in the system may ultimately cause severe self-discharge problems. The present invention relates to the development of a stable, active electrocatalyst for hydrogen or oxygen evolving/consuming electrodes in alkaline solution which does not require noble metals. Such an electrocatalyst has applications in fuel cells, electrolysis units, secondary batteries, etc. Its inherent good catalytic properties are of use also in other systems, such as oxidation reactions (e.g., hydrogen peroxide decomposition) or reduction reactions (e.g., hydrogenation).

BACKGROUND OF THE INVENTION

In water electrolysis cells with alkaline electrolyte, the electrode reactions may be written as:

$$2H_2O + 2e \rightarrow H_2 + 2OH^- \quad (1)$$

for hydrogen evolution, and $$4OH^- \rightarrow O_2 + 2H_2O + 4e \quad (2)$$

for oxygen evolution, the net cell reaction being $$2H_2O \rightarrow 2H_2 + O_2 \quad (3)$$

Reaction (1) occurs at a standard potential of $-0.83V$, whilst the standard potential for reaction (2) is $0.4V$. Clearly for an ideal electrolysis cell of this type, with perfect electrocatalysis and minimal resistance of electrodes and electrolyte, electrolysis should begin close to 1.23V (25° C.). Similarly, in a hydrogen-oxygen fuel cell with alkaline electrolyte reactions (1) and (2) are reversed, the anode reaction is hydrogen oxidation whilst the cathode reaction is oxygen reduction; the net cell reaction is water formation. An ideal fuel cell of this type would produce power close to 1.23V (25° C.).

In practical systems, however, the electrocatalysis is not ideal and electrolytes and electrodes have a finite resistance. Nevertheless by use of heavy loadings of platinum metals in optimized electrode structures, close spacing of electrodes, and other technological innovations, high energy efficiencies (above 70%) have been obtained for fuel cells and electrolysis units even for high power densities approaching $0.5W/cm^2$ of electrode surface.

In previous years, much attention has been given to synthesis of non-noble electrocatalysts for replacement of platinum metals in fuel cell and electrolysis cell applications. Considering the hydrogen consuming electrode in alkaline solution, an outstanding example of electrocatalyst development was the work on nickel boride by Jasinsky (W. Vielstich; Fuel Cells, Publ. John Wiley, 1970; Ch. 4, p. 171). This material, in the form of a porous conductive powder with a high surface area, was prepared by reducing a solution of a nickel salt in water using sodium borohydride. The boride electrocatalyst showed good stability and activity for hydrogen oxidation, the overvoltage was also low for hydrogen evolution. For oxygen reduction in alkaline solution mention may be made of the work of Kordesch (Ibid p. 178). On carbon or graphite, the oxygen reduction reaction does not go to completion, but instead produces hydrogen peroxide, present in alkaline solution as the perhydroxyl ion, $HO_2^-$.

$$O_2 + H_2O + 2e \rightarrow HO_2^- + OH^- \quad (4)$$

Reaction (4) proceeds at a standard potential of $-0.08V$, several tenths of a voltage below the standard potential of the full 4-electron oxygen reduction reaction (compare equation (2)); this would result in low fuel cell efficiencies. Kordesch catalyzed his carbon electrodes with mixed oxides of the transition metals. Some of these oxides, notably spinels of general formula $AB_2O_4$ where A and B are metal ions, e.g., A=Co, B=Al, showed pronounced activity for hydrogen peroxide chemical decomposition.

$$2HO_2^- \rightarrow 2OH^- + O_2 \quad (5)$$

and could work in concert with the 2-electron reaction (J. R. Goldstein et al., J. Phys. Chem. 76, 3646 (1972). By this means, the 4-electron reaction was made to go more or less to completion and the electrode performed quite efficiently, even when operated on air. The stability and performance level of these electrodes implied that other spinel oxides might prove useful electrocatalysts also.

In studies on composite electrodes for oxygen reduction akin to the Kordesch types, Goldstein (et al., J. Phys. Chem., 76, 3646 (1972)), investigated the graphite/cobalt-iron oxide spinel electrocatalyst system. They found (J. R. Goldstein et al., J. Catalysis, 32, 452 (1974)) that for the cobalt-iron oxide spinel system alone the composition $Co_1Fe_2O_4$, which is a cobalt ferrite possessed the highest intrinsic activity for hydrogen peroxide decomposition in alkaline solution, and great stability under such conditions. When prepared in high surface area form by co-precipitation, the ferrite mixed with graphite showed good electro catalytic activity for oxygen or air reduction in the same way the Kordesch systems did. However, cobalt ferrite alone (with no graphite present), possessing poor conductivity, showed little electrocatalytic activity.

BRIEF DESCRIPTION OF THE INVENTION

As stated above, cobalt ferrite is an active catalyst for hydrogen peroxide decomposition in alkaline systems. Cobalt ferrite has the serious drawback for certain applications, that its conductivity is low. The second catalyst refered to above, nickel boride has a good stability and conductivity.

According to the present invention there is provided a novel electrocatalyst of improved characteristics, which combines the advantageous qualities of the above catalysts and which can be used for various purposes, as will be set out in detail hereinafter.

The compounds of the present invention are generally of the spinel type. It is to be clearly understood that some of the compounds are similar in their structure to spinels, and some are mixed oxides. Wherever spinels are refered to this is intended to include the spinel-like compounds and mixed oxides of the compositions herein defined.

According to the present invention there is provided a cobalt spinels or mixed oxides having a high surface area, wherein there is incorporated a predetermined quantity of boron. The material in which boron is incorporated is designated hereinafter as "borided material." The incorporation of predetermined quantities of boron in cobalt spinels and mixed oxides brings about an increase of conductivity by a number of orders of magnitude. Furthermore the introduction of boron results in an enhanced resistance to reduction and oxidation and thus the novel compositions of matter according to the present invention are valuable and effective hydrogen reduction/oxidation electrocatalysts. The materials of choice are borided cobalt spinels and mixed oxides such as cobalt-iron oxides and cobalt-nickel oxides. The preferred compositions are $CoFe_2O_4$ or $Co_2NiO_4$. These are borided so as to incorporate in the ferrite from about 0.05 to 5 atom-% boron calculated on the spinel. Part of the iron, nickel and of the cobalt can be replaced by equivalent amounts of magnesium or calcium without substantially decreasing the activity of the resulting compounds. If desired, the product may be further modified for certain uses by lithiation which results in an enhanced stability for oxygen evolution. The boron content of about 0.05 to 5 atom-% is generally obtained by a boriding technique based on the use of a reducing agent such as an alkali metal borohydride (sodium borohydride or the like) or a reducing agent and a boron compound.

When the boride is introduced by means of a combination of boric acid and carbon, the boron content of the final product ranges from about 0.1 to 20 atom-% boron calculated on the spinel. In this technique there is advantageously used a high surface carbon black.

Cobalt ferrite having a high surface area may be prepared by a co-precipitation technique based on that used by Tseung and Goldstein (A. C. C. Tseung et al. J. Materials Sci., 7, 1383 (1972)). To a solution of suitable ferrous and cobalt salts (e.g., chlorides, acetates or sulphates) containing ferrous and cobalt ions in the molar ratio 2:1, a solution of potassium hydroxide (1-10N is added with stirring, until a pH of 12.5 is reached (25° C.). Due to the closeness in ionic radii of the metal ions ($Fe^{2+}$ = 0.74 Å, $Co^{2+}$ = 0.72 Å), a good solid solution of the metal hydroxides is formed. The resulting gel is aerated for an hour, to convert all $Fe^{2+}$ present to $Fe^{3+}$. The gel is then heated to 100° C. for an hour to achieve dehydration to the spinel phase, which occurs rapidly and completely at this pH, and the cobalt ferrite separates out as a fine black powder which may be filtered off, washed and dried.

The resulting powder has a cubic structure, determined by X-ray diffruction, and a large surface are (50-100m$^2$/g, determined by the B.E.T. technique using nitrogen), but its electrical resistivity is very poor (above $10^5$ ohm cm.). Chemical analysis shows that iron and cobalt are present mainly as $Fe^{3+}$ and $Co^{2+}$ respectively.

Various techniques may be used for boriding the cobalt ferrite, two of which are described: In the first, an intimate mixture of the ferrite with the powerful reducing agent, sodium borohydride is prepared with a weight ratio cobalt ferrite:borohydride in the range 1:1 to 5:1, and preferably about 3:1. The mixture is heated for 15 minutes at 600°-900° C. in air or ignited in air, using a suitable fuse (e.g., magnesium wire), and after the vigorous reaction has ceased, the product is water-quenched, filtered off, washed and dried. The resistivity of the powder drops enormously (to about 1 ohm cm.). The chemical analysis shows that although there is no measurable change in the $Fe^{3+}$ and $Co^{2+}$ content of the spinel, from 0.05-5 atom-% boron has entered the lattice.

According to the second technique, which makes use of readily available materials, a finer final product is obtained. An intimate mixture is prepared of ferrite (10-70% by weight), boric acid (10-50% by weight), and carbon black (10-50% by weight). The mixture is heat treated (900° C., 15 minutes, in air) wherein the carbon reduces the boric acid to boron, which reacts with the ferrite. According to this technique, the final product has a B.E.T. surface area of 25-50m$^2$/g, and a resistivity of about 1 ohm cm.; the boron content ranges from 0.1-20 atomic %.

Example 1 illustrates the preparation of high surface area cobalt ferrite by co-precipitation, and conversion of this to the borided form using sodium borohydride. The resulting powder may be used for producing electrodes for gas evolution tests by sandwiching same between two sheets of porous sintered nickel plaque (thickness of plaque about 0.5 mm, typical powder loadings 10-20 mg/cm$^2$). A light pressing and spot-welding of the nickel plaques ensures a robust structure which adequately retains the electrocatalyst powder. The performance of such an electrode for hydrogen and oxygen evolution from alkaline solution is described in Example 2, and comparison with a platinum black electrode of similar construction is given. The low overvoltage for hydrogen and oxygen evolution from alkaline solution of the electrocatalyst is evident, it has an obvious application in water (or heavy water) electrolysis cells with alkaline electrolyte.

For optimal performance as a gas consuming electrode, the electrocatalyst powder is preferably converted to a teflon-bonded gas diffusion electrode, supported on a nickel screen. Potentiostatic half cell studies showing the activity of the electrocatalyst for hydrogen oxidation and oxygen (air) reduction in alkaline solution are given in Example 3. The electrocatalyst is eminently suitable for incorporation into fuel cells with alkaline electrolyte. The marked activity of the electrocatalyst for both oxygen evolution and oxygen reduction is of particular value in rechargeable metal-air batteries such as zinc-air and iron-air. Electrocatalyst activities are very stable with time.

In certain applications requiring low current densities, say below about 20 mA/cm$^2$ of electrode surface area, (for example gas evolution from alkaline solution or minimum overvoltage electrochemical processes, the rather heavy sandwiched powder type electrode may be impractical. Thus, hydrogen is evolved at low rates from auxiliary electrodes for shape change removal in zinc-alkaline secondary batteries (G. Benczur - Urmossy, K. von Benda, and F. Maschka, Paper 25, Power Sources 5, ed. D. H. Collins (Publ. Orion Press, 1975), or from the dark cathode in cells based on the photoelectrolysis principle (A. B. Ellis, et al., J. American Chem. Soc., 98, 1635 (1976), In such cases, a lightweight electrode construction is beneficial. A suitably borided and stabilized cobalt ferrite layer may be supported by a lightweight substrate (foil or mesh of nickel, nickel-plated steel or titanium).

First, the substrate is electroplated from an aqueous solution to give a thin layer (5–15 mg/cm$^2$ of substrate), of cobalt-iron alloy, with the molar ratio Co:Fe of 1:2. A brief heat treatment (500°–800° C., 15 min, air), converts the alloy surface to the spinel oxide, cobalt ferrite. Boriding is carried out by covering the catalyzed substrate with a layer of either sodium borohydride (weight ratio, catalyst:borohydride of 1:1), or carbon black/boric acid mixture (weight ratio, spinel:boric acid:carbon of 1:3:3) and heating in air (900° C., 15 min.) The resulting light-weight electrode is stable to hydrogen evolution in alkaline solution but shows some desactivation with continuous oxygen evolution. Bacon showed that porous nickel electrodes may be activated/stabilized towards oxygen reduction and evolution in alkaline solution by lithium doping of the oxide surface; (A. B. Hart, Fuel Cells (Publ. Chapman and Hall 1967) Ch. 6, p. 177.) This is achieved by impregnating the electrode with a concentrated solution of the nitrates of lithium and nickel, and heating to 350° C. A lithiation process similar to that described by Bacon was effected with the lightweight electrodes.

The lithiation of the borided ferrite surface was effected by applying to the surface a concentrated solution of nitrates of lithium, iron and cobalt in a molar ratio of Li:Fe:Co of 3:4:2 and heating to 600°. There was obtained a catalytically active surface which was considerably more stable for oxygen evolution.

Example 4 illustrates the production of a light-weight electrode of the borided and lithiated cobalt ferrite type and the evaluation for such an electrode of respectively hydrogen and oxygen evolution from alkaline solutions. The novel electrodes of this type are characterized by a low overvoltage. It was found that the optimum content of lithium for oxygen evolution is between 0.1 and 2 atom-%.

The following Examples illustrate some specific embodiments of the present invention and these are to be construed in a non-limitative manner.

EXAMPLE 1

Preparation of High Surface Area Borided Cobalt Ferrite Electrocatalyst

To 100 ml of a stock solution of ferrous sulphate containing 2 ($\pm$0.1) M/l Fe$^{2+}$, 100 ml of a stock solution of cobalt sulphate containing 1 ($\pm$0.05) M/l Co$^{2+}$ were added. A solution of KOH (1N) was run in from a burette with continuous stirring, until pH 12.5 ($\pm$0.1), as observed with a glass electrode system (25° C.) was reached. The resulting gel was aereated 1 hr., and boiled (1 hr.). It was fully converted to the spinel, cobalt ferrite, which precipitated out as a fine black powder. The ferrite was filtered off, washed and dried (overnight, 100° C., air); its B.E.T. surface area (N$_2$) and resistivity were respectively 90 m$^2$/g and 5$\times$10$^5$ ohm cm. The ferrite was mixed about one-third its weight of sodium borohydride, and ignited in a nickel crucible using a magnesium fuse. After the brief, vigorous reaction had ceased, the product was water quenched filtered off, washed and dried (100° C., air, overnight). Analysis showed the molar ratio Co:Fe:B to be 1:2:0.15. The B.E.T. surface area of the borided cobalt ferrite was unchanged, but its resistivity had dropped to about 0.5 ohm cm. This material showed great stability (as evidenced by negligible weight changes) in alkaline solution for both reduction reactions (hydrogen evolution from zinc powder) and oxidation reactions (oxygen evolution from hydrogen peroxide) which were vigorously catalyzed.

EXAMPLE 2

Evaluation of Borided Cobalt Ferrite Electrocatalyst Powder for Hydrogen and Oxygen Evolution from Alkaline Solution A sample of borided cobalt ferrite electrocatalyst powder prepared according to Example 1 was evenly dispersed between two pieces of porous nickel plaque (length 8 cm, breadth 5 cm, thickness 0.5 mm, porosity 80%), which were pressed and spot welded together; the optimum powder loading was 15mg/cm$^2$ of sandwich and each plate weighed about 6 g. Two plates of this type fitted with current leads of nickel foil, were placed parallel to one another about 1 mm apart, between them being inserted a suitable spacer (10 mesh plastic screen) and were immersed in 40 wt % KOH at 70° C. A microreference electrode of the mercury/mercuric oxide type was placed between the plates.

Electrolysis was carried out with a power supply and current density and cell voltage, and voltage of each electrode with respect to the reference was monitored. The results for the borided cobalt ferrite electrode and an identical setup using a platinum black electrocatalyst (B.E.T. surface area 10 m$^2$/g) in place of the ferrite, are listed below. The low overvoltage of the borided ferrite for hydrogen and oxygen evolution from alkaline solution, similar to that of platinum black, is clearly demonstrated. These performance characteristics did not deteriorate during a test period of 1 year continuous operation.

TABLE I

| System (70° C) | Cell Potential (theoretical at 70° C = 1.20V) (V) | Potential of Reference Versus $H_2$ Evolving Electrode (V) | Potential of $O_2$ Evolving Electrode Versus Reference (V) |
|---|---|---|---|
| Current density 10mA/cm$^2$ | | | |
| Borided ferrite electrocatalyst | 1.45 | 1.00 | 0.44 |
| Platinum black electrocatalyst | 1.40 | 0.98 | 0.41 |
| Current density 50 mA/cm$^2$ | | | |
| Borided ferrite electrocatalyst | 1.50 | 1.02 | 0.46 |
| Platinum black electrocatalyst | 1.47 | 1.00 | 0.44 |
| Current density 100 mA/cm$^2$ | | | |
| Borided ferrite electrocatalyst | 1.66 | 1.07 | 0.55 |
| Platinum black electrocatalyst | 1.59 | 1.04 | 0.50 |
| Current density 200 mA/cm$^2$ | | | |
| Borided ferrite electrocatalyst | 1.71 | 1.07 | 0.57 |
| Platinum black electrocatalyst | 1.65 | 1.04 | 0.52 |

EXAMPLE 3

Evaluation of Borided Cobalt Ferrite Powder for Hydrogen Oxidation and Oxygen Reduction in Alkaline Solution (Gas Consuming Electrodes)

A sample of borided cobalt ferrite powder, prepared according to Example 1, was converted to a Teflon-bonded gas diffusion electrode. A 100 mesh nickel screen (5 cm square) was used as current collector, and the electrocatalyst (0.3g) slurried with Teflon solution (0.16 ml of 60% w/v Teflon suspension) and water (2ml) was pasted uniformly onto this. Following drying (1 hr, 80° C., air) and curing (1 hr, 300° C., air) to make the system suitably hydrophobic, the electrode was cut into 1 cm squares for polarization testing. The floating electrode method (Goldstein et al., J. Phys. Chem., 76, 3646 (1972)) was employed, using a half-cell setup (hydrogen reference electrode) and potentiostat, the electrolyte was 40 wt % KOH at 70° C. The feed gas was for hydrogen oxidation hydrogen at 1 atm., and for oxygen reduction air at 1 atm. The good performance of the electrocatalyst may be inferred from the current-voltage data below (resistance-free figures).

TABLE II

| Hydrogen oxidation (Borided cobalt ferrite electrode, 40 wt % KOH at 70° C 1 atm $H_2$) Open circuit = OV | | | | |
|---|---|---|---|---|
| Current density (mA/cm$^2$) | 10 | 50 | 100 | 250 |
| Potential versus hydrogen reference (V) | 0.005 | 0.015 | 0.025 | 0.1 |
| Oxygen (air) reduction (Borided cobalt ferrite electrode, 40 wt % KOH at 70° C 1 atm air) Open circuit = 1V | | | | |
| Current density (m/Acm$^2$) | 10 | 50 | 100 | 250 |
| Potential versus hydrogen reference (V) | 0.92 | 0.85 | 0.82 | 0.65 |

EXAMPLE 4

Preparation of a Lightweight Borided Cobalt Ferrite Electrode and Its Properties for Hydrogen or Oxygen Evolution from Alkaline Solution A strip of nickel foil (length 10 cm, breadth 2 cm, thickness 0.1 mm) was made the cathode in an electroplating bath of such composition as to plate out an iron-cobalt alloy of molar ratio 2:1. A suitable bath contained: $CoSO_4 \cdot 7H_2O$ (satd.), $FeSO_4 \cdot 7H_2O$ (200 g/l), $FeCl_2 \cdot 6H_2O$ (50 g/l), boric acid (30 g/l), sulphuric acid (to pH 2). Electroplating was carried out at 66° C. at a current density of 40 mA/cm$^2$, using a steel anode in contact with cobalt shot, until an alloy loading of 10 mg/cm$^2$ had built up on the nickel substrate. Analysis showed the Fe:Co molar ratio to be within 5% of 2:1. After oxidation (15 min, 800° C., air) to convert the alloy surface to cobalt ferrite, the surface was evenly covered with a mixture of boric acid (30 mg) and carbon black (30 mg) and then heat treated (15 min, 900° C., air) to insert boron into the spinel lattice. The boron content was about 0.2 atomic % of the spinel. The catalyzed foil weighed 160 mg.

This catalyzed foil could be used directly for hydrogen evolution experiments from alkaline solution, but for enhanced stability for oxygen evolution, it was lithiated. The electrode surface was painted with about 1 ml of a viscous solution containing 3 M/l of Li$^+$, 4 M/l of Fe$^{3+}$, and 2 M/l of Co$^{2+}$ (as nitrates), dried at 120° C., and heat treated (600° C., 15 min, air). This lithiation procedure was repeated, and the electrode was washed and dried. Analysis showed that about 0.5 atomic % Li had entered the spinel lattice.

For evaluation of gas evolution, two treated foils of the above dimensions, one lithiated, one not, were placed in parallel (1 mm apart) with a 10-mesh nylon screen between them, and were immersed in 40 wt % KOH at 70° C. Electrolysis was carried out using a power supply, with hyrogen evolved from the non-lithiated electrode and oxygen from the lithiated electrode.

The electrolysis voltage (theoretical at 70° C. = 1.20V) is given below as a function of current density for these lightweight electrodes, and demonstrates the low overvoltage of the system for hydrogen and oxygen evolution from alkali solution.

| Cell voltage (V) | 1.45 | 1.51 | 1.68 | 1.75 |
|---|---|---|---|---|
| Current density (mA/cm$^2$) | 10 | 50 | 100 | 200 |

EXAMPLE 5

Preparation of High Surface Area $Fe_1Co_2O_4$ Spinel Electrocatalyst in Its Borided Form and Evaluation of Its Properties for Hydrogen Peroxide Decomposition To 100 ml of a stock solution of ferrous chloride containing 1($\pm$0.05) M/l Fe$^{2+}$, 100 ml of a stock solution of cobalt chloride containing 2($\pm$0.1) M/l Co$^{2+}$ were added. A solution of KOH(2N) was run in from a burette with continuous stirring, until a pH 12.5 ($\pm$0.1), as observed with a glass electrode system at 25° C. was reached. The resulting gel was aereated during 1 hour and boiled during a further hour, it was fully converted to the spinel $Fe_1Co_2O_4$, which precipitated as a fine black powder. The spinel was filtered off, washed and dried (overnight, 100° C., air); its B.E.T. surface area (N$_2$) and resistivity were respectively 80 m$^2$/g and 10$^6$ ohm cm. Boriding was carried out by intimately mixing 5g of the $Fe_1Co_2O_4$ powder with 2g of boric acid and 2g of carbon black, and heating in air (15 min, 900° C.). The B.E.T. surface area of the product was about 100 $m^2/g$; its resistivity had fallen to about 2 ohm cm. Analysis showed the molar ratio Fe:Co:B to be 1:2:0:2.

The borided $Fe_1Co_2O_4$ was evaluated for hydrogen peroxide decomposition from alkaline solution by measuring gasometrically the rate of oxygen evolution under standard conditions. For 100 mg of catalyst, injected into 5 ml of stabilizer-free $H_2O_2$ solution (1 M/l) together with 50 ml of 7N KOH, the rate of oxygen evolution at 25° C. and 1 atm pressure was measured and extrapolated to zero time. The initial rate for the borided spinel was $2 \times 10^{-4}$ mole $O_2$/sec/gm catalyst; this may be compared with figures for the catalyst before boriding, $1.5 \times 10^{-4}$ mole $O_2$/sec/gm catalyst, and for a platinum black sample (10 $m^2/g$) which gave $2.5 \times 10^{-4}$ mole $O_2$/sec gm/catalyst, showing the good catalytic activity of the borided material.

EXAMPLE 6

Preparation of High Surface Area Borided $Ni_1Co_2O_4$ Spinel Electrocatalyst and Evaluation of Its Overvoltage for Hydrogen Evolution in Alkaline Zincate Electrolyte High surface area $Ni_1Co_2O_4$ spinel was prepared by the freeze drying method of A. C. C. Tseung et al., J. Materials Science 5, 604 (1970). To 100 ml of a stock solution of nickel nitrate containing 0.05 ($\pm 0.005$) M/l $Ni^{2+}$, 100 ml of a stock solution of cobalt nitrate containing 0.1 ($\pm 0.01$) M/l $Co^{2+}$ was added. The solution of salts was placed in a Buchner flask connected to a high pressure nitrogen supply, and was sprayed as a fine jet through a nozzle into a dish containing liquid nitrogen, thus freezing the liquid droplets instantaneously. The solid sample was then subjected to a vacuum of 0.1 torr until all traces of water had been removed, such a point being indicated by a reduction of pressure to $10^{-3}$ torr. The freeze dried nitrate was then decomposed under vacuum by slowly increasing the temperature from 25° C. to 250° C. over a 3 hour period. After cooling to room temperature, air was admitted, and a final treatment during 4 hours, 400° C., air, resulted in $Ni_1Co_2O_4$ spinel as a black powder, surface area 60 $m^2/g$ by the B.E.T. method ($N_2$) and resistivity 100 ohm cm. For boriding this material, about 1 g was mixed with 0.25 g sodium borohydride and heated in air during 15 min, at 900° C. Following water quenching, filtering, washing and drying (overnight, 100° C., air), the borided spinel was analyzed, indicating a molar ratio Ni:Co:B of 1:2:0.1. The B.E.T. surface area was 50 $m^2/g$, the resistivity had dropped to 0.1 ohm cm. Analysis showed that a $NiCo_2O_{3.6}$ spinel was obtained which was oxygen deficient.

For evaluation as to hydrogen overvoltage, the borided spinel was spread in an even layer at a loading of 10 mg/$cm^2$ between pieces of sintered nickel plaque of dimensions — length 10 cm, width 1 cm, thickness 0.5 mm, a robust, leak-tight envelope being provided by light pressing and spot welding. The catalytically active electrode was placed at a distance of 5 mm from a large active zinc electrode in 30 wt % KOH saturated with zincate, the two electrodes being in external electrical contact. At 25° C., a current density of 15 mA/$cm^2$ was measured at the catalyzed electrode at a potential of +200 mV versus the zinc electrode, hydrogen being evolved from the catalized electrode. The zinc electrode was replaced by a nickel sheet and electrolysis carried out with the nickel as anode and the catalyzed electrode as cathode. Hydrogen was evolved from the cathode at continuous currents of up to 50 mA/$cm^2$ with no zinc plateout during the test period (1 month). These experiments demonstrate the low overvoltage for hydrogen evolution of the electrocatalyst.

We claim:

1. Crystalline mixed oxide selected from compounds of the formulae $Co_xFe_{3-x}O_n$ and $Co_xNi_{3-x}O_n$, wherein x is between 0.05 and 3, n is between 3 and 5, containing from about 0.05 to 20 atom percent boron calculated on the mixed oxide.

2. A crystalline mixed oxide according to claim 1, of the spinel crystal type.

3. A crystalline mixed oxide according to claim 1 wherein n is between 3.6 and 4.

4. A crystalline mixed oxide compound according to claim 1 wherein part of the cobalt, nickel or iron is replaced by an equivalent quantity of magnesium or calcium lithium.

5. Crystalline oxides containing boron, according to claim 1 consisting of oxides of the transition metals Co, Ni, Fe, optionally containing magnesium or calcium in a proportion so as to replace some of the Co, Ni or Fe, of spinel crystal structure.

6. Borided mixed oxides according to claim 1 in powder form.

7. Borided mixed oxides according to claim 1 in the form of an active surface layer.

8. A mixed oxide containing boron, according to claim 1 wherein part of the cobalt, nickel or iron is replaced by lithium.

9. A mixed oxide according to claim 6 in the form of a powder having a surface area of at least 20 $m^2/g$ determined by the BET techique.

10. An electrocatalytically effective surface comprising as active substance a mixed according to claim 1.

11. An electrocatalytically active electrode comprising as electrocatalytically active substance a spinel according to claim 3.

12. A process for producing an electrocatalytically active mixed oxide containing boron according to claim 1 which comprises reacting the mixed oxide in powder form with sodium borohydride at elevated temperature.

13. A process according to claim 12 for producing an electrocatalytically active borided mixed oxide which comprises reacting the mixed oxides with boric acid and carbon at elevated temperature.

14. A process for producing lithiated electrocatalytically active borided mixed oxides according to claim 4, of increased corrosion resistance in alkaline solutions, which comprises applying to said spinel a suitable lithium salt and subjecting same to a heat treatment, thus incorporating therein a predetermined quantity of lithium.

15. A process according to claim 14, wherein the mixed oxide is coated with a solution of lithium nitrate, iron nitrate and cobalt nitrate and the heat treatment is at a temperature of from 400° to 800° C.

16. Electrical secondary cells, fuel cells or electrolysis cells comprising an electrocatalytically active borided mixed oxide claimed in claim 1 in the form of an electrode or auxiliary electrode.

17. Electrochemical cells according to claim 16, wherein the borided spinel is lithiated.

* * * * *